Patented Nov. 8, 1932

1,887,051

UNITED STATES PATENT OFFICE

HAROLD C. WEBER, OF MILTON, MASSACHUSETTS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OILS

No Drawing. Application filed November 3, 1930. Serial No. 493,246.

This invention refers more particularly to the hydrogenation of hydrocarbon oils.

In one of its specific embodiments the invention contemplates the provision of a process wherein hydrocarbon oils are hydrogenated by electrolytically generated hydrogen. This is accomplished by mixing the hydrocarbons with water which has been made an electrical conductor by the addition of an electrolyte thereto, for example a salt, acid or base which ionizes when dissolved in the water, or by mixing the hydrocarbon oil with a salt, base or other material molten under the conditions of treatment, hydrogen being generated when an electric current is passed through the hydrocarbon mixture. Generally speaking various substances or mixtures which generate hydrogen when an electric current is passed therethrough may be used in conjunction with the hydrocarbon material to be treated, the hydrogen so formed causing the hydrogenation of the materials being treated or the conversion products depending upon the conditions of treatment.

In a more specific aspect of the invention I make use of electrodes for the electrolysis referred to, composed of materials which will be attacked by the ions liberated at the positive pole. During the electrolysis these electrodes will decompose and form continuously in the reacting mass finely divided salts, oxides or hydroxides of the materials of which the electrodes are composed. The products resulting from the decomposition or reaction of the positive pole serve as very active catalysts for the hydrogenation reaction forming continuously in the reacting mass finely divided salts, oxides or hydroxides which facilitate the desired hydrogenation. As examples of the electrode which I may use for the purpose of forming the active catalysts, I may mention iron, various alloys of iron, chromium, tungsten and other materials either alone or in admixture or as alloys. By a proper choice of the electrode materials catalysts of various activity may be formed and such catalysts may be continuously renewed by the electro-decomposition.

In some cases it has been found desirable to add catalysts in addition to those formed during the process and it has also been found desirable in some cases to add molecular hydrogen from some external source. My invention also contemplates the introduction of other substances into the oil undergoing treatment while passing the electric current therethrough, examples of which are oxygen, chlorine steam, alcohol or acetone preferably in the vaporized state or other gases or vapors which may be caused to react with the hydrocarbon oil in the presence of the electrically formed catalysts whether with or without the addition of other catalytic materials.

Where such extraneous materials are added it may be desirable to segregate the gaseous products of electrolysis, for example hydrogen or oxygen, in which case the extraneously added materials may be introduced into either of the segregated zones depending upon the desired reactions.

In carrying out the process of my invention either direct or alternating currents of any desired frequency may be used including those alternating currents ranging from frequencies of 60 cycles or less per second to those of several million cycles per second. The process may be carried out at various temperatures and pressures including those from atmospheric and upward to those of high superatmospheric pressure and conversion temperature wherein the hydrocarbon oils may be converted into lower boiling products. The cracking reaction may be accompanied by simultaneous hydrogenation with the material undergoing treatment or the products thereof. The conditions of treatment are selected depending upon the products desired, as well as economic conditions generally.

By the use of my process one may use as raw materials hydrocarbons which are deficient in hydrogen, for example those of a more or less pitchy or asphaltic character, which may include various tars such as those obtained from wood, lignite, peat, coal, oil shales and the like, or hydrocarbon residues either from the atmospheric distillation of petroleum or the residues resulting from a previous cracking operation; or mixtures similar in general character to the above named materials such as mixtures of hydrocarbons and pitches or coal have been found suitable for treatment by the process of my invention. Improved results can be obtained by the application of the invention in the conversion of hydrocarbons of any character, which includes distillates as well as residual oils substantially reducing the formation of heavy residues and increasing the yields of lower boiling products, for example those suitable for motor fuel. In all cases the increased yields of lower boiling products depend on the characteristics of the materials undergoing treatment, as well as the amount of hydrogen generated or introduced but the latter being under control. The process is also applicable to the production of suitable charging stocks for subsequent treatment under conversion conditions of temperatures and/or pressures, an example of which is the hydrogenation of a very viscous and heavy cracking residue to produce a cracking stock which, upon subsequent treatment, greatly increases the yield of low boiling products obtained by the process.

As a specific example of the operation of the process of my invention, an electric current was passed through a molten bath of the mixed hydroxides of sodium and potassium; using iron electrodes. Some hydrogen was introduced during the electrolysis. The positive pole disintegrated with the formation of ferric hydroxide which functioned as a catalyst in the hydrogenation of the hydrocarbons undergoing treatment. Hydrogenation was effected at temperatures below and above the cracking temperatures, resulting in a high recovery of liquid products and a relatively high yield of the lower boiling hydrocarbons, with no appreciable coke formation.

Similarly, when a dilute aqueous solution of sodium chloride was electrolyzed at an elevated temperature under the generated pressure of the electrolyte and the oil undergoing treatment, which in this case was a heavy residual oil, the positive pole disintegrated to form a dispersion of hydrated iron compounds, the hydrogen generated serving to hydrogenate the hydrocarbons undergoing treatment, thereby improving its character for subsequent heat and pressure treatment in the production of motor fuels. Electrolysis is carried out at various pressures up to several thousand pounds per square inch with increasing temperatures of the electrolyte and the oil undergoing treatment.

I claim as my invention:

1. A process for the hydrogenation of hydrocarbons comprising passing an electric current through a mixture containing the said hydrocarbons and a substance capable of conducting the electric current, the said substance being characterized by ability to react with the electrodes between which the current is flowing to form finely divided solid secondary products insoluble in the hydrocatebons which act catalytically to promote the hydrogenation of said hydrocarbons.

2. A process such as claimed in claim 1, characterized in that the hydrocarbons are subjected to an elevated temperature.

3. A process such as claimed in claim 1, characterized in that the hydrocarbons are subjected to a cracking temperature.

In testimony whereof I affix my signature.

HAROLD C. WEBER.